United States Patent
Vargas Gonzalez

(10) Patent No.: US 10,289,846 B2
(45) Date of Patent: May 14, 2019

(54) SYSTEMS AND METHODS FOR DETECTING AND ADDRESSING REMOTE ACCESS MALWARE

(71) Applicant: Easy Solutions Enterprises Corp., Sunrise, FL (US)

(72) Inventor: Javier Fernando Vargas Gonzalez, Bogota D.C. (CO)

(73) Assignee: EASY SOLUTIONS ENTERPRISES CORP., Sunsrise, FL (US)

( * ) Notice: Subject to any disclaimer, the term of this patent is extended or adjusted under 35 U.S.C. 154(b) by 175 days.

(21) Appl. No.: 15/099,993

(22) Filed: Apr. 15, 2016

(65) Prior Publication Data
US 2016/0308888 A1    Oct. 20, 2016

Related U.S. Application Data

(60) Provisional application No. 62/149,295, filed on Apr. 17, 2015.

(51) Int. Cl.
*G06F 21/56* (2013.01)
*G06F 21/55* (2013.01)
*H04L 29/06* (2006.01)

(52) U.S. Cl.
CPC ............ *G06F 21/566* (2013.01); *G06F 21/55* (2013.01); *G06F 21/554* (2013.01); *G06F 21/56* (2013.01); *H04L 63/145* (2013.01)

(58) Field of Classification Search
CPC ...... G06F 21/566; G06F 21/56; G06F 21/554; G06F 21/55; H04L 63/145
See application file for complete search history.

(56) References Cited

U.S. PATENT DOCUMENTS

| | | | | |
|---|---|---|---|---|
| 7,555,776 B1* | 6/2009 | Lymer | ..................... | G06F 21/56 715/790 |
| 9,342,687 B2* | 5/2016 | Boodaei | ................... | G06F 21/50 |
| 2002/0070920 A1* | 6/2002 | Challener | ............... | G06F 3/023 345/168 |
| 2005/0099395 A1* | 5/2005 | Marsden | ................. | G06F 3/023 345/168 |
| 2007/0214393 A1* | 9/2007 | Cox, Jr. | ................... | G06F 3/023 714/47.1 |

(Continued)

OTHER PUBLICATIONS

Al-Hammadi et al., "Detecting Bots Based on Keylogging Activities", pp. 1-6, https://arxiv.org/ftp/arxiv/papers/1002/1002.1200.pdf (Year: 2010).*

*Primary Examiner* — Theodore C Parsons
*Assistant Examiner* — Carlos M De Jesus Lassala
(74) *Attorney, Agent, or Firm* — Greenberg Traurig, LLP

(57) ABSTRACT

Systems and methods to detect remote access malware activities, via: detecting, in a computing device, first input events in an operating system of the computing device; detecting, in the computing device, second input events received in an application running in the computing device; detecting, in the computing device, a mismatch between the first input events detected in the operating system and the second input events received in the application running in the computing device; and in response to the mismatch being detected, generating an alert indicating a threat of the application being attached by remote access malware.

15 Claims, 3 Drawing Sheets

(56) References Cited

U.S. PATENT DOCUMENTS

| | | | | |
|---|---|---|---|---|
| 2009/0172823 A1* | 7/2009 | Maor | ............... | G06F 21/83 |
| | | | | 726/29 |
| 2009/0199296 A1* | 8/2009 | Xie | ............... | G06F 21/316 |
| | | | | 726/23 |
| 2009/0271866 A1* | 10/2009 | Liske | ............... | G06F 21/53 |
| | | | | 726/23 |
| 2011/0320816 A1* | 12/2011 | Yao | ............... | G06F 21/316 |
| | | | | 713/171 |
| 2013/0007466 A1* | 1/2013 | Sarangdhar | ............ | G06F 21/83 |
| | | | | 713/189 |
| 2014/0283038 A1* | 9/2014 | Call | ............... | H04L 63/1441 |
| | | | | 726/22 |
| 2014/0325682 A1* | 10/2014 | Turgeman | ............ | H04L 63/126 |
| | | | | 726/29 |
| 2015/0205962 A1* | 7/2015 | Swidowski | ............ | G06F 21/566 |
| | | | | 726/23 |
| 2016/0004853 A1* | 1/2016 | Boodaei | ............... | G06F 21/316 |
| | | | | 726/17 |

* cited by examiner

SYSTEMS AND METHODS FOR DETECTING AND ADDRESSING REMOTE ACCESS MALWARE

RELATED APPLICATIONS

The present application claims the benefit of the filing date of Prov. U.S. Pat. App. Ser. No. 62/149,295, filed Apr. 17, 2015 and entitled "Systems and Methods for Detecting and Addressing Remote Access Malware," the entire disclosure of which application is hereby incorporated herein by reference.

FIELD OF THE TECHNOLOGY

At least some embodiments disclosed herein relate to information security in general and more particularly but not limited to monitoring input events to detect and/or prevent attacks made via remote access.

BACKGROUND

As the use of computing devices, software, and the Internet expands, threats from malicious software, also referred to as "malware," increases as well. Such malware can be used, for example, to take control of some or all of a computing device's functionality, to collect otherwise-sensitive or private information, and to spread malware to other devices. Malware has been used in conjunction with criminal activities such as fraud (e.g., identity theft), corporate espionage, and other illicit activities.

Remote Access Trojans (or RATs) are one such form of malware, and can be used to open a hidden channel that allow an attacker to remotely control a victim's system for a variety of illicit purposes, including spying on a spouse to stealing corporate information. Remote control tools are often added into the most popular kits of malware, allowing criminals to bypass modern defenses, particularly where stealing credentials to access a system is alone not sufficient to gain access.

Various attempts to defend against malware include adding more restrictive authentication factors, such as machine identification or Internet Protocol (IP) address whitelisting, but malware versions typically evolve to respond to such defenses. Some institutions implement authentication processes that require to be started from a known machine and also verify the presence of specialized software or devices such smartcards or pen drives. Some security mechanisms are configured to reject transactions coming from unknown IP addresses.

RATs, however, provide criminals with the capability to bypass diverse authentication controls by posing as a legitimate user using a legitimate machine. With RATs, the attack is performed using the very same machine as the legitimate user, effectively circumventing protections based on device identification, environment profiling and hardware-based authentication tokens such as smart cards or pen drives.

On the one hand, RATs pose a severe security threat to many institutions, but on the other hand desktop sharing and remote administration are widely used for a variety of legitimate purposes. At least some embodiments disclosed herein help detect and address illicit remote-access events while allowing valid remote-access events to function as intended, as well as addressing other issues.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
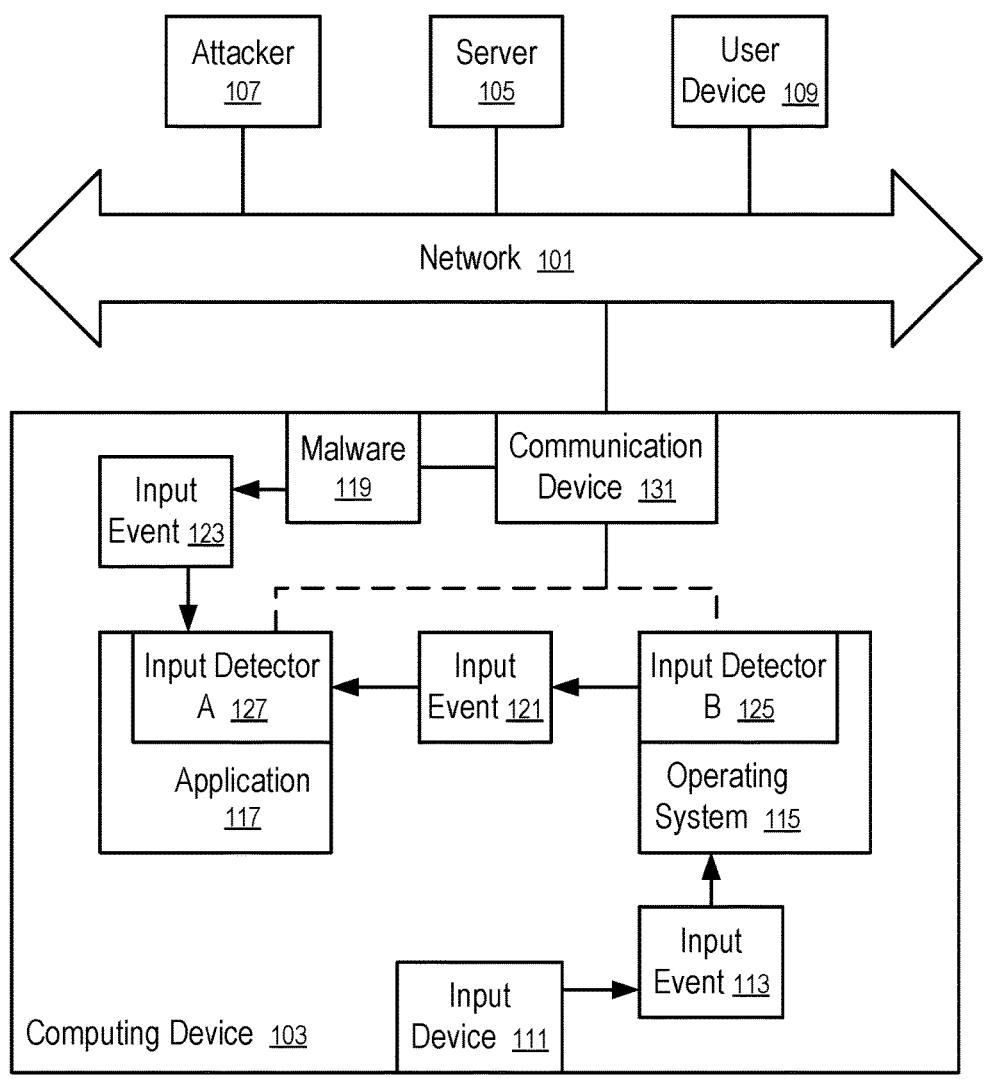
FIG. 1 shows a system configured to detect activities of remote access malware according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Systems and methods of various embodiments will now be described more fully hereinafter with reference to the accompanying drawings, which form a part hereof, and which show, by way of illustration, specific example embodiments. Inventions may, however, be embodied in a variety of different forms and, therefore, not being limited to any example embodiments set forth herein; example embodiments are provided merely to be illustrative. Likewise, a reasonably broad scope for claimed or covered subject matter is intended. Among other things, for example, inventions may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments Among other things, embodiments disclosed herein help detect when a software application is being remotely controlled. If such remote control is inappropriate or otherwise undesired, various embodiments may generate alerts, block the remote access, and/or address the remote control in any other suitable manner. In some embodiments, the responses to the detection of possible attacks made via remote access are configured to provide a seamless experience when running in end-user environments as well as corporate networks, without conflicts on devices used for multiple purposes.

The present disclosure includes various methods, apparatuses (including computer systems) that perform such methods, and computer readable media containing instructions that, when executed by computing systems, cause the computing systems to perform such methods.

In one embodiment, a method to detect remote access includes: monitoring events associated with a hardware component of a computing device by a first software module operating on the computing device; monitoring events associated with a software application operating on the computing device by a second software module operating on the computing device; determining, based on a comparison of the events associated with the hardware component and the events associated with the software application, that the software application is being controlled remotely; and generating an alert in response to the determination that the software application is being controlled remotely. Preferably, the first software module is implemented in the operating system of the computing device; and the second software module is implemented in the software application. More preferably, the first software module is implemented in the operating system on the path of event propagation from input devices of the computing device through the operating system to the software. Even more preferably, the first software module is implemented on the path at a location as close to the input devices as possible. For example, the method can be implemented in a system as illustrated in FIG. 1.

FIG. 1 shows a system configured to detect activities of remote access malware according to one embodiment.

In FIG. 1, a computing device (103) has one or more input devices (111) and at least one communication device (131) coupled on a network (101). Based on user actions, the input device (111) generates input events (113) that are captured by the operating system (115), processed by the operating system (155), and dispatched as input events (121) to relevant applications (e.g., 117) running on the computing device (103). For example, the application (117) may be a web browser, general purpose software, or a specially designed application.

When the computing device (103) has malware (119) that has remote access capability, the malware (119) may generate synthetic input event (123) independent of the input events (113) that are initiated from the input device (111) of the computing device (103). The malware (119) may feed the synthetic input event (123) to the application (117) to control the operation of the application (117) and use the communication device (131) to establish a communication channel to the attacker (107) that allows the attacker (107) to gain access to and/or control of the operations and/or data of the computing device (103) over the network (101).

In some instances, a legitimate application may operate in a similar manner as the malware (119) to provide synthetic input events (123) to the application (127) in order to allow a remote device (e.g., 109) to access the application (117) for a legitimate purpose.

In FIG. 1, the system is configured to detect the remote control of the application (117) using two input detectors (125 and 127). One input detector (125) is implemented in the operation system (115) to monitor input events from the input device (111) through the operating system (115) to the application (117). Another input detector (127) is implemented in the application (117) to monitor the input events (121, 123) received in the application. The input detectors (125 and 127) are configured to detect the presence of synthetic input events (123) and optionally block the input events (123) from being further processed in the application (117) and/or generate an alert about the synthetic input events and/or the application being remotely controlled.

For example, the alert may be presented on a user interface of the computing device (103) to inform a local user of the computing device (103), who is using the input device (111), about the application (117) being remotely controlled.

For example, the alert may be communicated via the communication device (131) to a remote server (105) to notify a human operator and/or apply further security measures.

For example, the alert may be communicated via the communication device (131) and/or the remote server (105) to a user device (109) such as a mobile phone, a tablet computer of the user or administrator of the computing device (103).

Thus, embodiments of the present disclosure help provide real-time or near-real-time detection and/or neutralization of remotely-controlled sessions. In this context, a "session" may refer to any kind of activity that implies privileged access to resources, information or functionality hosted by a server or centralized platform. The session may take place using any kind of client software, such as, a web browser, general purpose software or a specially designed application.

Figure 2:
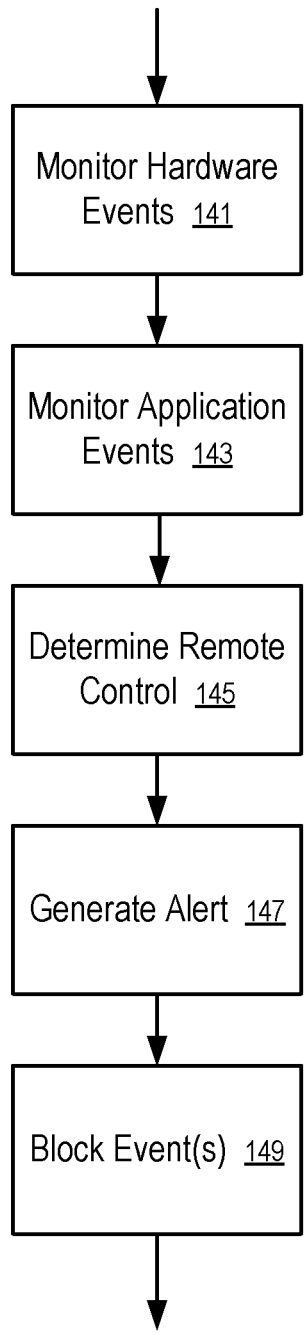
FIG. 2 is an exemplary method according to various aspects of the present disclosure.

FIG. 2 illustrates an exemplary method according to various aspects of the present disclosure for detecting and addressing a software application that is being remotely controlled. The method of FIG. 2 may be performed by any suitable computing device, such as by computing device (103) illustrated in FIG. 1 or computing devices (103 and 104) depicted in FIG. 3.

In FIG. 2, the method includes: monitoring (141) events (e.g., 113) associated with a hardware component (e.g., input device (111)) of a computing device (e.g., 103) by a first software component (e.g., 125) operating on the device (e.g., 103); monitoring (143) events (e.g., 121 and 123) associated with a software application (e.g., 127) operating on the computing device (e.g., 103) by a second software component (e.g., 127); determining (145) that the software application (117) is being controlled remotely based on a comparison of the hardware events and the software application events; generating (147) an alert in response to determining that the software application is being controlled remotely; and blocking (149) one or more events in response to a determination that the software application (117) is being controlled remotely.

The first software component (e.g., 125) monitors (141) the activity (e.g., input events (113)) generated by, and associated with, one or more hardware components, such as input devices (111) of the computing device. In some exemplary embodiments, the first software component (which may also be referred to herein as the "first software layer," "first layer," "low-level layer," or "LLL") runs at the lowest available level inside the operating system, or at least at a level whereby the first software component can monitor each of the events associated with one or more hardware components and where the first layer is able to monitor all the interactions (input events) coming from the input hardware. In some embodiments, for example, the first software component runs out of protected memory on the computing device as part of the kernel of the operating system.

The second software component (e.g., 127) runs on top of a software application of interest, and monitors (143) input events (e.g., 123 and 121) or notifications associated with and/or received by the application (117). Preferably, input events (e.g., 123 and 121) received in the application (117) are processed and/or filtered by the second software component before being passed onto the other components of the application (117) for further processing. The second software component may also be referred to herein as the "second software layer," "second layer," "application-level layer," or "ALL.

The second layer is deployed at the application layer in the computing device. The second software component can be included inside a software application to be monitored by modifying the software application prior to runtime, such as by using an add-on or plugin system or by modifying the original application. The second software component may also be included in the software application by injecting the code into the application at runtime.

A result of the comparison of the events associated with one or more hardware components and the events associated with a software application can be used to determine whether the software application is being controlled remotely (145). For example, the system may detect inconsistencies between the events coming from the input hardware and the input events arriving at the software application and take any desired action as a result—such as generating an alert (147) and/or selectively blocking (149) or discarding application-level input events observed by the second software component that are not also observed as associated with the hardware by the first software component. In this manner, embodiments of the disclosure can effectively detect and block synthetic input events (123) typically sent by remote controlling kits.

In some embodiments, an external server (105) or platform is be contacted by the device-resident modules (125 or 127) to alert the server to activity that may be associated with the remote control of a software application (117). For example, the first and second software modules may operate on a first device (such as computing device (103 or 104) in FIG. 1 or 3) and communicate with a second device (e.g., server (105) in FIG. 1, one of the computing devices (103 and 104) in FIG. 3). In such a scenario, the first and second software layers may keep track of the input-events (at the hardware and application levels, respectively) and, based on an inconsistency between the observances of the two modules or other determination that the application is being controlled remotely, an alert is generated (147) to the external server. Among other things, this allows third parties in communication with the server to obtain insight about potential remote control activity associated with a client computing device.

In normal operating conditions, a user of the client computing device starts a session by executing a software application on the client computing device and, in most cases, the input interaction with the software application will always come from the hardware peripherals of the client computing device. Accordingly, user input will flow from the hardware through the low level software interface (device drivers, hardware abstraction layer, etc.), all the way to the application in the form of input events delivered by the events delivery mechanisms of the operating system.

In one embodiment, upon input arrival to the client application, the Application Level Layer (ALL) queries the Low Level Layer (LLL) in order to determine whether if the input in question came from the underlying hardware or if it was synthesized by a third party. If the input comes out to be synthesized the ALL may drop it, effectively inhibiting any interaction that a third party (e.g., attacker (107)) could have with the client application. In some embodiments, the LLL may query the ALL for the events associated with the software application. In yet other embodiments, the LLL may provide the ALL with the events associated with the hardware component, and the LLL may provide the ALL with the events associated with the application. Any other desired information may likewise be communicated between the LLL, the ALL, and other systems and software components.

The first and second software layers (LLL and ALL) may monitor events associated with the hardware and software application in any desired manner, and may monitor such events differently for different platforms and different operating systems. In some embodiments, the first software component may monitor events associated with the hardware by, for example, counting the number of input events generated by one or more hardware components, analyzing the type(s) of events detected, and/or by analyzing a timestamp associated with one or more of the events.

Embodiments of the disclosure may utilize any method that allows the LLL to determine when queried by the ALL if a given input message (e.g., an input event) was previously registered by the monitoring mechanism of the LLL. For example, the LLL may modify input messages coming from the hardware by adding information that allows the ALL to determine if a given message went through the LLL. Such information may include an identifier that is key-encrypted according to keys held by the ALL and LLL, thereby allowing the ALL to not only identify the event as being modified by the LLL, but to verify that the event is authentic based on the encrypted identifier. Use of such information also allows the ALL to verify the LLL observed an event without having to perform any kind of query to LLL.

While events may be selectively blocked (149), such as by blocking synthesized input detected by the ALL, embodiments of the present disclosure may also adopt a more passive posture where remote-control activity is detected and notified to an external entity, such as an external server or other software application operating on, or remote from, the client computing device. In such cases, alerts may be generated (147) using any kind of communication protocol available to client computing device. The external entity may then instruct the LLL, ALL, or other system or software component to block one or more events.

The events associated with a hardware component and the events associated with the software application may be compared in a variety of different ways, such as by comparing any such event or set of events to a pattern associated with remote-controlled behavior of a software application. The techniques for identification of patterns related to remote control behaviors can vary among implementations, and may be tuned for domain specific proposes. In some embodiments, the comparison between the hardware events and the software application events may include computing the difference between application-level events and low-level (hardware) events and flag an alert whenever the application-level events are more than low-level input events by a predetermined threshold. This threshold may be 0 (i.e., a singe application event exceeding the number of hardware events triggers the alert) or greater in order to allow predetermined amounts of synthetic input to be tolerated.

Comparison of the hardware and application events may also include performing a risk-assessment algorithm to generate a risk level. An example of a risk assessment method for remote control related pattern detection is provided below.

In one embodiment, the LLL (125) counts input events (113) received from hardware within a plurality of time slots as X1, X2, X3, . . . , Xn respectively for time slots 1, 2, 3, . . . , n. Similarly, the ALL (127) counts input events (121 and 123) received in the application (117) as Y1, Y2, Y3, . . . , Yn respectively for the time slots 1, 2, 3, . . . , n. For each of the time slots, if the input events (113) counted by the LLL (125) is less than the input events (121 and 123) counted by the ALL (127) (e.g., Xi<Yi for time slot i, where i is 1, 2, . . . , or n), the corresponding time slot (e.g., slot i if Xi<Yi) is classified as an alerted slot; otherwise, the corresponding time slot is classified as a non-alerted slot.

The risk r of being remotely controlled can be calculated using the following formula.

$$r = 1/(1 + e^{-k(a/c - b)})$$

where a is the count of number of alerted slots among the time slots 1, 2, 3, . . . , n; c is the account of non-alerted slots among the time slots 1, 2, 3, . . . , n; and k and b are constants that allow the risk output to be tuned to fit domain specific needs.

The computation of the risk-level can take place in one of the software layers of the system or in an additional application in charge of asking the system layers for their observations and determining the riskiness of the observed behavior. The computed risk level can be compared to a threshold to determine action (e.g., blocking, and/or alerting)

Once remote control related behavior is detected, an alert may be sent to another system, such as an alert management platform, where it can be used to notify interested third parties or to record the activity history of the protected device in a database.

In one embodiment, a method to detect remote access malware activities includes: detecting, in a computing device (103), first input events (113) in an operating system (115) of the computing device (103); detecting, in the computing device (103), second input events (121, 123) received in an application (117) running in the computing device (103); detecting, in the computing device (103), a mismatch between the first input events (113) detected in the operating system (115) and the second input events (121 and 123) received in the application (117) running in the computing device (103); and in response to the mismatch being detected, generating (147) an alert indicating a threat of the application being attached by remote access malware.

For example, the computing device (103) can be configured to communicate the alert to a server (105) over a computer network (101). The alert can be configured to cause/instruct the server (105) to generate a notification about the threat to a user device (109) and/or present the notification the user interface (137) of the computing device (103).

The first input events (113) can be detected via first software (125) running in the operating system (115) of the computing device (103); and the second input events (121, 123) can be detected via second software (127) in the application (117) running in the computing device (103).

For example, in response to an input event (121 or 123) received in the application (103), the second software (127) in the application is configured in one embodiment to transmit, to the first software (125) in the operating system, a request for a confirmation that the input event (121 or 123) corresponds to one of the first input events (113) detected in the operating system (115) of the computing device (103). In response to a determination that the input event (123) received in the application (117) is not resulted from the first input events (113) detected in the operating system, the second software (127) in the application (117) causes the application (117) to ignore the input event (123) for further processing.

In response to the request from the second software (127), the first software (125) running in the operating system (115) is configured in one embodiment to determine whether the input event (121 or 123) received in the application is originated from the first input events (113) detected in the operating system (115). The first software (125) can make the determination based on: counting the first input events (113); tracking the types of the first input events (113); and/or tracking, via the first software running in the operating system, the timestamps of the first input events (113).

The first software (125) running in the operating system (115) is configured in one embodiment to embed data into input events (121) communicated from the operating system (115) to the application (117); To detect the mismatch between the first input events (113) detected in the operating system (115) and the second input events (121 and 123) received in the application (117) running in the computing device (117), the second software (127) is configured in one embodiment to detect an input event (123), among the second input events (121 and 123) received in the application (117), that does not have the data provided by the first software (125) running in the operating system (115). Examples of the data embedded in the input events (121) propagated from the operating system (115) to the application (117) include: a secret shared between the first software (125) and the second software (127); a digital signature of the first software (125); a security token; etc. The second software (127) configured in the application (117) may optionally block any input event (123) that does not have the data provided by the first software (125) running as part of the operating system (115).

In one embodiment, a mismatch is detected based on comparing the amount and type of the first input events (113) detected in the operating system (115) of the computing device (103), and the amount and type of the second input events (121 and 123) received in the application (117) running in the computing device (103).

In one embodiment, a mismatch is detected based on a determination that the second input events (121 and 123) received in the application (117) running in the computing device (103) are a threshold amount more than the first input events (113) detected in the operating system (115) of the computing device (103).

In one embodiment, a risk of the threat estimated based on comparing amounts of input events (113) detected in the operating system (115) and amounts of input events (121 and 123) received in the application (117) during a plurality of time slots respectively. In one embodiment, the risk is a function of the ratio between a count of the alerted time slots where there are more input events received in the application (117) than input events received in the operating system (115), and a count of non-alerted time slots where there are no more input events received in the application (117) than input events received in the operating system (115).

In one embodiment, a method includes: monitoring events associated with a hardware component of a client computing device by a first software module operating on the client computing device; monitoring events associated with a software application operating on the client computing device by a second software module operating on the client computing device; determining, based on a comparison of the events associated with the hardware component and the events associated with the software application, that the software application is being controlled remotely; and generating an alert in response to the determination that the software application is being controlled remotely.

For example, the first software module can be installed at a lowest available level within an operating system running on the client computing device; and the second software module can be installed at an application layer of the client computing device, via one or more of a software add-on and a software plug-in, by modifying the software application prior to runtime, and/or by injecting the second software module into the software application at runtime.

In comparing the events associated with the hardware component and the events associated with the software application, the first software module may query the second software module for the events associated with the software application. Alternatively, the second software module may query the first software module for the events associated with the hardware component.

To compare the events associated with the hardware component and the events associated with the software application, the first software module may provide the events associated with the hardware component to the second software module; and/or the second software module may provide the events associated with the software application to the first software module.

To detect remote control activities, one or more of the events associated with the hardware component and the events associated with the software application are compared to a pattern associated with remote controlled behavior.

Alternatively or in combination, to detect remote control activities, a difference between the number of events associated with the hardware component and the number of events associated with the software application is computed and compared with a predetermined threshold.

In one embodiment, the monitoring of the events associated with the hardware component includes modifying each event by the first software module (e.g., inserting information recognizable by the second software module), counting events associated with the hardware component, analyzing one or more types of events associated with the hardware component, and analyzing a timestamp for an event from the events associated with the hardware component.

Figure 3:
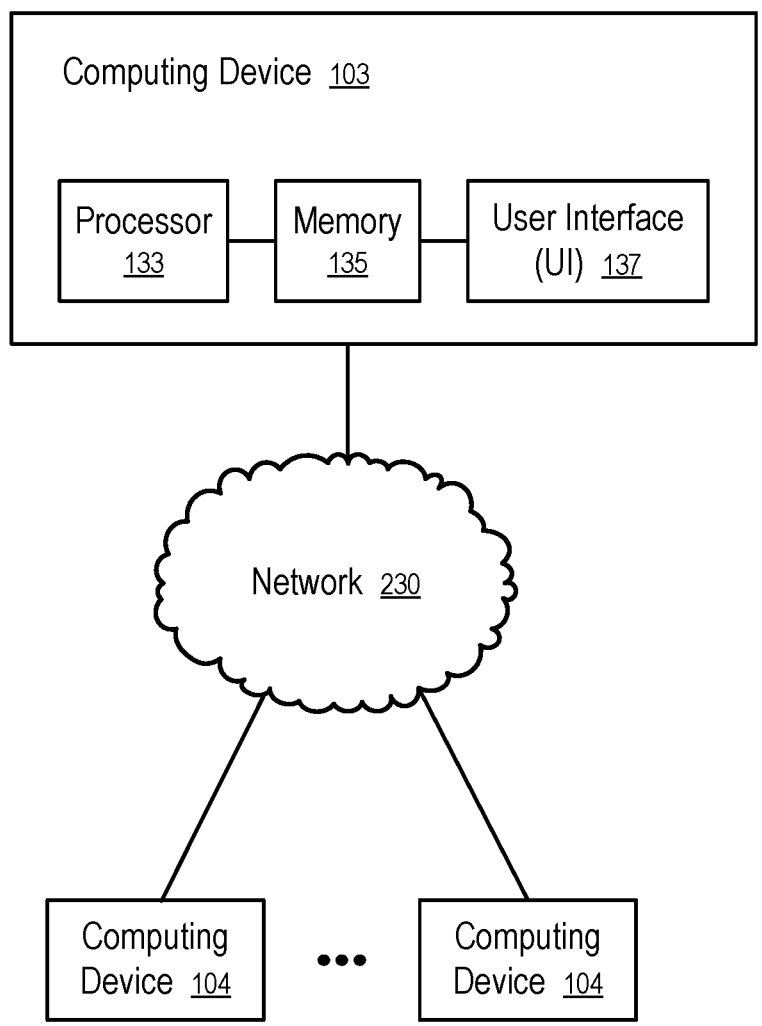
FIG. 3 is a block diagram of an exemplary system according to various aspects of the present disclosure.

FIG. 3 is a block diagram of system which may be used in conjunction with various embodiments. While FIG. 3 illustrates various components of a computer system, it is not intended to represent any particular architecture or manner of interconnecting the components. Other systems that have fewer or more components may also be used.

In FIG. 3, the system (130) includes a computing device (103) comprising a processor (133), memory (135), and user interface (137). The computing device (103) may include any number of different microprocessors, memory components, and user interface components, and may interact with any other desired systems and devices in conjunction with embodiments of the present disclosure.

The functionality of the computing device (103), including the methods described above (in whole or in part), may be implemented through the processor (133) executing computer-readable instructions stored in the memory (135) of the computing device (103). The memory (135) may store any computer-readable instructions and data, including software applications, applets, and embedded operating code. Portions of the functionality of the methods described herein may also be performed via software operating on one or more of the other computing devices (104).

The functionality of the computing device (103) or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor (133) retrieves and executes instructions stored in the memory (135) to control the operation of the computing device (103). Any type of processor, such as an integrated circuit microprocessor, microcontroller, and/or digital signal processor (DSP), can be used in conjunction with embodiments of the present disclosure. A memory (134) operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory (135) in any desired manner, such as in a relational database.

The computing device (103) includes a user interface (137) that may include any number of input devices (not shown) to receive commands, data, and other suitable input. The user interface (137) may also include any number of output devices (not shown) to provides the user with data, alerts/notifications, and other information. Typical I/O devices may include mice, keyboards, modems, network interfaces, printers, scanners, video cameras and other devices.

The computing device (103) may communicate with one or more client computing devices (104), as well as other systems and devices in any desired manner, including via network (101). The computing device (103) and/or client computing devices (104) may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network (101) may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

Communication among systems, devices, and components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: shipping data, package data, and/or any data useful in the operation of the system.

Various functionalities may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, Opera, or any other of the myriad software packages available for browsing the internet.

Various embodiments may operate in conjunction with any suitable operating system (e.g., Windows NT, 95/98/2000/CE/Mobile/, Windows 7/8, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

The various system components may be independently, separately or collectively suitably coupled to a network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that embodiments of the present disclosure may operate in conjunction with any suitable type of network, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may be located at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous JavaScript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A method to detect remote access malware activities, the method comprising:
   embedding first software in an operating system of a computing device;
   detecting, by the first software running in the computing device, first input events received in the operating system of the computing device;
   embedding second software in an application running in the computing device;
   detecting, by the second software running in the computing device, second input events received in the application running in the computing device;
   detecting, via communications between the first software and the second software in the computing device, an input event received in the application, the input event corresponding to a mismatch between the first input events received in the operating system and the second input events received in the application running in the computing device,
      wherein the mismatch is detected based on a determination that the second input events received in the application running in the computing device are a threshold amount more than the first input events detected in the operating system of the computing device; and in response to the mismatch being detected,
        generating an alert indicating a threat of the application being attacked by remote access malware;
        communicating, from the computing device, the alert to a server over a computer network;
        receiving, from the server, an instruction to block the input event that corresponds to the mismatch; and
        blocking, by the second software in the application, the input event that corresponds to the mismatch.

2. The method of claim 1, wherein the alert causes the server to generate a notification about the threat to a user device.

3. The method of claim 1, wherein the input event is one of the second input events, the method further comprising, in response to the input event received in the application,
    transmitting, from the second software in the application to the first software in the operating system, a request for a confirmation that the input event corresponds to one of the first input events detected in the operating system of the computing device.

4. The method of claim 3, further comprising:
    determining, via the first software running in the operating system, whether the input event received in the application is originated from the first input events detected in the operating system.

5. The method of claim 4, further comprising:
    counting, via the first software running in the operating system, the first input events, wherein the determining of the input event received in the application is originated from the first input events detected in the operating system is based on the counting.

6. The method of claim 4, further comprising:
    tracking, via the first software running in the operating system, types of the first input events, wherein the determining of the input event received in the application is originated from the first input events detected in the operating system is based on the types tracked for the first input events in the operating system.

7. The method of claim 4, further comprising:
    tracking, via the first software running in the operating system, timestamps of the first input events, wherein the determining of the input event received in the application is originated from the first input events detected in the operating system is based on the timestamps tracked for the first input events in the operating system.

8. The method of claim 1, further comprising:
    embedding, via the first software running in the operating system, data in input events communicated from the operating system to the application;
    wherein the detecting of the mismatch between the first input events detected in the operating system and the second input events received in the application running in the computing device includes:
        detecting the input event, among the second input events, that does not have the data provided by the first software running in the operating system.

9. The method of claim 8, wherein the data is a secret shared between the first software and the second software.

10. The method of claim 8, wherein the data includes a digital signature of the first software.

11. The method of claim 8, further comprising:
    blocking, via the second software in the application, the input event that does not have the data provided by the first software running in the operating system.

12. The method of claim 1, wherein the mismatch is detected based on comparing:
    amount and type of the first input events detected in the operating system of the computing device, and
    amount and type of the second input events received in the application running in the computing device.

13. The method of claim 1, further comprising:
    determining a risk of the threat based on comparing amounts of input events detected in the operating system and amounts of input events received in the application during a plurality of time slots respectively.

14. A non-transitory computer storage medium storing instructions configured to instruct a computing device to perform a method, the method comprising:
    detecting, using first software embedded in an operating system of a computing device, first input events received in the operating system of the computing device;
    embedding, via the first software running in the operating system, data in input events communicated from the operating system to the application, wherein the data includes a secret shared between the first software and the second software;
    detecting, using second software embedded in an application running in the computing device, second input events received in the application running in the computing device;
    detecting, via communications between the first software and the second software in the computing device, an input event received in the application, the input event corresponding to a mismatch between the first input events received in the operating system and the second input events received in the application running in the computing device, wherein the mismatch is detected in response to a determination that the input event, among the second input event, does not have the data provided by the first software running in the operating system,
        wherein the mismatch is detected based on a determination that the second input events received in the application running in the computing device are a threshold amount more than the first input events detected in the operating system of the computing device; and
    in response to the mismatch being detected,
        generating an alert indicating a threat of the application being attacked by remote access malware;
        communicating, from the computing device, the alert to a server over a computer network;
        receiving, from the server, an instruction to block the input event that corresponds to the mismatch; and
        blocking, via the second software in the application, the input event that corresponds to the mismatch.

15. A computing device, comprising:
a communicating device;
at least one microprocessor; and
a memory storing instructions configured to instruct the at least one microprocessor to:
    detect, using first software embedded in an operating system of a computing device, first input events received in the operating system of the computing device;
    embed, via the first software running in the operating system, data in input events communicated from the operating system to the application, wherein the data includes a digital signature of the first software;
    detect, using second software embedded in an application running in the computing device, second input events received in the application running in the computing device; and detect, via communications between the first software and the second software in the computing device, an input event received in the application, the input event corresponding to a mismatch between the first input events detected in the operating system and the second input events received in the application running in the computing device, wherein the mismatch is detected in response to a determination that the input event, among the second input event, does not have the data provided by the first software running in the operating system, and wherein the mismatch is detected based on a determination that the second input events received in the application running in the computing device are a threshold amount more than the first input events detected in the operating system of the computing device; and in response to the mismatch being detected,
generate an alert indicating a threat of the application being attacked by remote access malware;
communicating, from the computing device, the alert to a server over a computer network;
receiving, from the server, an instruction to block the input event that corresponds to the mismatch; and
blocking, via the second software in the application, the input event that corresponds to the mismatch.

* * * * *